(12) United States Patent
Malin

(10) Patent No.: US 11,934,435 B2
(45) Date of Patent: Mar. 19, 2024

(54) SYSTEMS AND METHODS FOR USING DATA APPLICATIONS AND DATA FILTERS TO IMPROVE CUSTOMER COMMUNICATIONS

(71) Applicant: Good Egg Media LLC, Northbrook, IL (US)

(72) Inventor: Jay I. Malin, Northbrook, IL (US)

(73) Assignee: Good Egg Media LLC, Northbrook, IL (US)

( * ) Notice: Subject to any disclaimer, the term of this patent is extended or adjusted under 35 U.S.C. 154(b) by 0 days.

(21) Appl. No.: 17/846,315

(22) Filed: Jun. 22, 2022

(65) Prior Publication Data

US 2022/0405311 A1 Dec. 22, 2022

Related U.S. Application Data

(60) Provisional application No. 63/213,602, filed on Jun. 22, 2021.

(51) Int. Cl.
| | | |
|---|---|---|
| *G06F 16/33* | (2019.01) | |
| *G06F 16/2458* | (2019.01) | |
| *G06F 16/335* | (2019.01) | |
| *G06Q 30/02* | (2023.01) | |
| *G06Q 30/0201* | (2023.01) | |
| *G06Q 30/0251* | (2023.01) | |

(52) U.S. Cl.
CPC ........ *G06F 16/335* (2019.01); *G06F 16/2465* (2019.01); *G06Q 30/0201* (2013.01); *G06Q 30/0269* (2013.01); *G06Q 30/0281* (2013.01)

(58) Field of Classification Search
CPC .............. G06F 16/335; G06F 16/2465; G06Q 30/0201
See application file for complete search history.

(56) References Cited

U.S. PATENT DOCUMENTS

| | | | | |
|---|---|---|---|---|
| 6,122,663 A | * | 9/2000 | Lin ........................... | G06F 9/50 709/224 |
| 2015/0294013 A1 | * | 10/2015 | Ozer .................. | G06Q 10/0639 707/754 |

* cited by examiner

*Primary Examiner* — Loc Tran

(74) *Attorney, Agent, or Firm* — Leydig, Voit & Mayer, Ltd.

(57) ABSTRACT

A method is provided. The method comprises: obtaining, from a data source computing system and by a data filter analytics computing system, event information associated with one or more events; determining, by the data filter analytics computing system, a dynamic data filter for the event information; generating, by the data filter analytics computing system, customer information based on filtering the event information using the dynamic data filter; and causing, by the data filter analytics computing system, display of the customer information on a user device, wherein the customer information comprises a configurable graphical representation of the customer information.

15 Claims, 14 Drawing Sheets

400

450

Electric usage snapshot for February: you used 4,183 kWh.

550

800

Edit event

Event Name:
sd

Event Description:
sdf

Start Date: mm/dd/yyyy    End Date: mm/dd/yyyy

Template:

Channel:
SMS

Message 1
sdfsdfs

Channel:

SMS

Message 1 sdfsdfs

Send after [3] hrs

Message 1 sdfsd

Send after [3] hrs

Message 1 sdfsdf

Send after [3] hrs

Add New Message

Rules

SYSTEMS AND METHODS FOR USING DATA APPLICATIONS AND DATA FILTERS TO IMPROVE CUSTOMER COMMUNICATIONS

This patent application claims the benefit of U.S. Provisional Patent Application No. 63/213,602, filed Jun. 22, 2021, which is incorporated by reference herein in its entirety.

BACKGROUND

Multidisciplinary role of data management within an organization has been highlighted recently. For instance, there is a demand for a faster time to deliver new products and services to the market, thereby leveraging data into platform applications and solutions. In many industries, and especially utility industries, this also means an easier fulfillment of regulatory requirements. For instance, during severe weather or other types of disasters or events that cause power outages, traditionally, there is a gap in communications between utility services with customers during long power restorations associated with severe weather. Accordingly, there remains a technical need for using data applications and data filters to improve customer communications.

SUMMARY

In some instances, a method is provided. The method comprises: obtaining, from a data source computing system and by a data filter analytics computing system, event information associated with one or more events; determining, by the data filter analytics computing system, a dynamic data filter for the event information; generating, by the data filter analytics computing system, customer information based on filtering the event information using the dynamic data filter; and causing, by the data filter analytics computing system, display of the customer information on a user device, wherein the customer information comprises a configurable graphical representation of the customer information.

In some examples, a data filter analytics computing system is provided. The data filter analytics computing system comprises one or more processors and a non-transitory computer-readable medium having processor-executable instructions stored thereon, the processor-executable instructions, when executed, facilitating performance of the following: obtaining, from a data source computing system, event information associated with one or more events; determining a dynamic data filter for the event information; generating customer information based on filtering the event information using the dynamic data filter; and causing display of the customer information on a user device, wherein the customer information comprises a configurable graphical representation of the customer information.

In some variations, a non-transitory computer-readable medium having processor-executable instructions stored thereon is provided. The processor-executable instructions, when executed, facilitating performance of the following: obtaining, from a data source computing system, event information associated with one or more events; determining a dynamic data filter for the event information; generating customer information based on filtering the event information using the dynamic data filter; and causing display of the customer information on a user device, wherein the customer information comprises a configurable graphical representation of the customer information.

All examples and features mentioned above may be combined in any technically possible way.

BRIEF DESCRIPTION OF THE DRAWINGS

The subject technology will be described in even greater detail below based on the exemplary figures, but is not limited to the examples. All features described and/or illustrated herein can be used alone or combined in different combinations. The features and advantages of various examples will become apparent by reading the following detailed description with reference to the attached drawings which illustrate the following:

FIGS. 10 and 11 show display screens for providing administrative interfaces for rules and templates in accordance with one or more examples of the present application.

DETAILED DESCRIPTION

Figure 1:
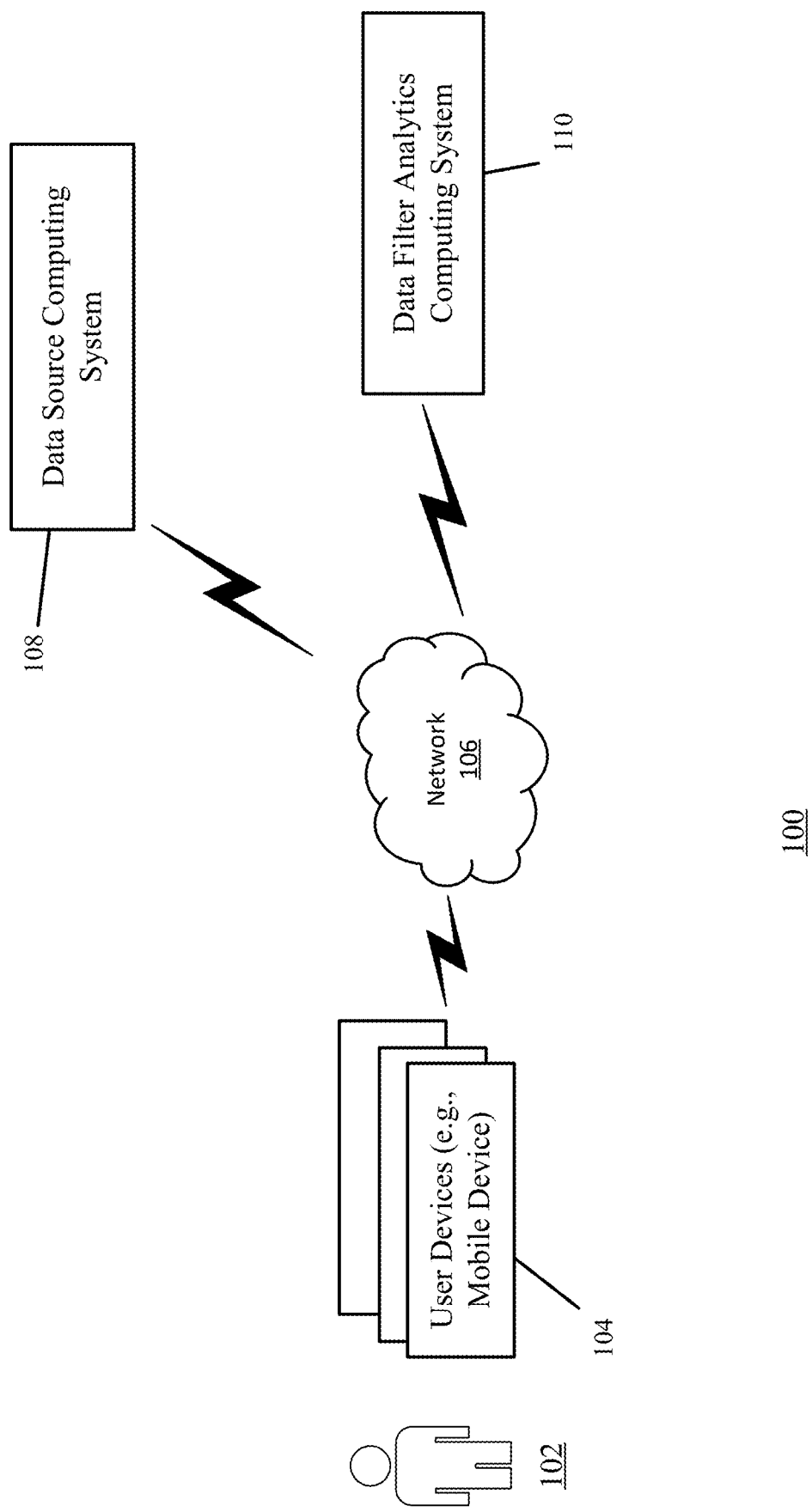
FIG. 1 is a simplified block diagram depicting an exemplary computing environment in accordance with one or more examples of the present application.

Examples of the presented application will now be described more fully hereinafter with reference to the accompanying FIGs., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Systems, methods, and computer program products are herein disclosed that provide for using data applications and data filters to improve customer communications. In many industries, and especially utility industries such as power generation enterprise organizations, this also means an easier fulfillment of regulatory requirements. These benefits resonate best with public sector clients, and therefore it is imperative that a computing platform provides real-time access to data and analytics to fulfill the mission. In the case of public safety, it may be to deliver the most accurate response as soon as possible. Utility companies seek to maximize customer engagement and loyalty while alleviating the time to respond to calls. The present application may be particularly useful to service providers such as utilities responsible for communicating with stakeholders, particularly customers. However, other industries that use data applications and data filtering to improve customer communications is also contemplated within the present application.

The ability to deliver data applications is in part facilitated, by the availability of new cloud tools and platforms with superior data handling capabilities. It may also be facilitated by the deployment of real-time automatic metering infrastructure (AMI) whereby a smart device collects and transmits near real-time user data to a central database. This requires that an organization now collects and sorts extremely large volumes of data and in real-time sort, share, and display this data. Partitioned databases, replicated warehouses, data marts, pipelines and business intelligence (BI) tools may now be replaced by a single high-availability cloud platform (e.g., a data filter analytics computing system) that delivers all of this computationally intensive functionality with limited latency. Data may represent user data such as gigabyte (GB), kilowatts (KW), gallons, or thermal units, non-exclusively at any specific time.

The present application uses data applications to provide unparalleled flexibility in rapidly deploying new applications for public sector mission critical communications. For instance, in some examples for using the present application, the data filter analytics computing system may be configured to send a single customer (e.g., a user) a message with a link to a configurable graphical analytics page that describes resource (water, electricity, gas, internet bandwidth) usage across timeframes. The comparisons may be static with periodicity and range pre-calculated or may be dynamic. This occurred primarily because this data was started in a mart, versus tool powerful enough to offer such granularity. As such, graphs with analytics may be delivered at the stakeholder level (e.g., customer/user level) defined by an account number, contact detail, or transformer/node/feeder to provide real-time calls to action.

In some variations, the data filter analytics computing system may be configured to send a single customer a message with a link to a configurable table that shows an aggregate view of customers restored in a configurable area by time. This provides the customer with feedback as to the progress in restoring services in their neighborhood.

In some instances, the data filter analytics computing system may be configured to process incoming calls of service requests (e.g., 9-1-1 centers), and may be correlated to geographic information system (GIS) data such as nearby incidents, environmental conditions such as traffic and power outages, in order to route the service request to a single customer representative expeditiously routing first responders to the incident.

In some examples, the data filter analytics computing system may be associated with an electric utility company that is able to instantly set thresholds based upon when the previous message was sent, the content in the message such as estimated service restoration time (sometimes called ERT, ETR, or ETOR), thereby bridging gaps in automated communications. Herein, real-time filters perform data analysis functions to compare current user data to a previous period; for an electric utility, it may be a comparison of estimated restoration time of a service ticket generated by a dispatch system (computer aided dispatch—CAD, outage management system—OMS, or advanced distribution management system—ADMS) during disparate periods.

In some variations, the data filter analytics computing system may be configured to send messages (e.g., personal notifications) to customers impacted by severe weather based upon geographic preferences and data trends such as cumulative service restorations. These and other examples will be described in further detail below.

In operation, the data filter analytics computing system may use data applications that leverage data across the entire organization to display trends and expose opportunities for improvement. A correlation between field crew experience and geographic information systems (GIS) locations may be a leading indicator for service restoration times. Abandoned calls may be more likely from specific mobile carriers and geographic areas. This correlation may yield a set of stakeholders (e.g., users) such as accounts that meet the various threshold requirements and instead of downloading a list, the conditions become a filter on a communications dashboard which may be invoked to trigger messages that inform and/or lead to calls to action. As an example: a set of customers who received a message yesterday informing them that their power would be restored today should be aware that due to a delay, some may be restored later today and the rest tomorrow. Rather than export the list, flexible fields that may be selected on the dashboard and/or scripted like a conditional statement (similar to an SQL query) creates the list and sends a message. This message may use a flexible or predefined messaging template across channels such as email, voice, text, social and related messaging applications. The message may have flexible fields that describe user information. A sequence of messages may be programmed based upon a set of conditions such as changes in ERT and duration of the disruption to create a sequential "drip" flow of informational messages which express empathy and communicates sources of information to relieve the customer's needs during the disruption. These informational messages may include text, multimedia pictures, and video, and links to external sources such as websites.

FIG. 1 is a simplified block diagram depicting an exemplary environment in accordance with an example of the present application. The environment 100 includes users (e.g., individuals and/or stakeholders) 102, user devices (e.g., mobile device) 104 associated with the users 102, a data source computing system 108, and a data filter analytics computing system 110. Although the entities within environment 100 may be described below and/or depicted in the FIGs. as being singular entities, it will be appreciated that the entities and functionalities discussed herein may be implemented by and/or include one or more entities.

The entities within the environment 100 such as the user devices 104, the data source computing system 108, and/or the data filter analytics computing system 110 may be in communication with other systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100.

Users 102 may operate, own, and/or otherwise be associated with the user devices 104. For instance, the user devices 104 may be mobile phones such as a smartphone that is owned and/or operated by a user 102. The user 102 may provide information to the other entities of environment 100 such as the data filter analytics computing system 110 using the user device 104. For example, the user device 104 may receive user input from the user 102, process the user input, and/or provide the user input to the data filter analytics computing system 110.

The user device 104 may be and/or include, but is not limited to, a desktop, laptop, tablet, mobile device (e.g., smartphone device, or other mobile device), smart watch, an internet of things (IOT) device, or any other type of computing device that generally comprises one or more communication components, one or more processing components, and one or more memory components. The user device 104 may be able to execute software applications managed by, in communication with, and/or otherwise associated with an enterprise organization (e.g., a utility company).

The data source computing system 108 is a computing system that is configured to obtain event data associated with one or more events such as power or service outages, resource utilization, service requests, environmental conditions, service disruptions (e.g., an internet outage), leaks (e.g., gas leaks or water main breaks/leaks), severe weather events and/or other types of events. For instance, the data source computing system 108 may be configured to obtain actual, real-time event data such as service outage data. The data source computing system 108 may be configured to provide the data to the data filter analytics computing system 110.

The data source computing system 108 includes one or more computing devices, computing platforms, systems, servers, data repositories, and/or other apparatuses capable of performing tasks, functions, and/or other actions. The data source computing system 108 may be implemented using one or more computing platforms, devices, servers, and/or apparatuses. In some variations, the data source computing system 108 may be implemented as engines, software functions, and/or applications. In other words, the functionalities of the data source computing system 108 may be implemented as software instructions stored in storage (e.g., memory) and executed by one or more processors.

The data filter analytics computing system 110 is a computing system that is configured to receive information from the user devices 104 and/or the data source computing system 108. For instance, the data source computing system 108 may be configured to receive user input from the user devices and/or event data from the data source computing system 108. The data filter analytics computing system 110 may also receive criteria information from one or more operators such as filter parameters or criteria. The data filter analytics computing system 110 may process the event data based on the user input and/or the criteria information to filter out the data. In some instances, the user device 104 may provide the filter criteria to the data filter analytics computing system 110. For instance, the user 102 may provide criteria as to what information they would want and the user device 104 may provide this criteria information to the data filter analytics computing system 110. Further, the data filter analytics computing system 110 may provide information to the user devices 104 so as to inform the users 102 of event information (e.g., services outage information such as expected time for service to be restored).

The data filter analytics computing system 110 includes one or more computing devices, computing platforms, systems, servers, and/or other apparatuses capable of performing tasks, functions, and/or other actions. The data filter analytics computing system 110 may be implemented using one or more computing platforms, devices, servers, and/or apparatuses. In some variations, the data filter analytics computing system 110 may be implemented as engines, software functions, and/or applications. In other words, the functionalities of the data filter analytics computing system 110 may be implemented as software instructions stored in storage (e.g., memory) and executed by one or more processors.

It will be appreciated that the exemplary environment depicted in FIG. 1 is merely an example, and that the principles discussed herein may also be applicable to other situations—for example, including other types of institutions, organizations, devices, systems, and network configurations. As will be described herein, the environment 100 may be used by service or utility organizations (e.g., service provider and/or utility or power providers). However, in other instances, the environment 100 may be used by other types of organizations.

Figure 2:
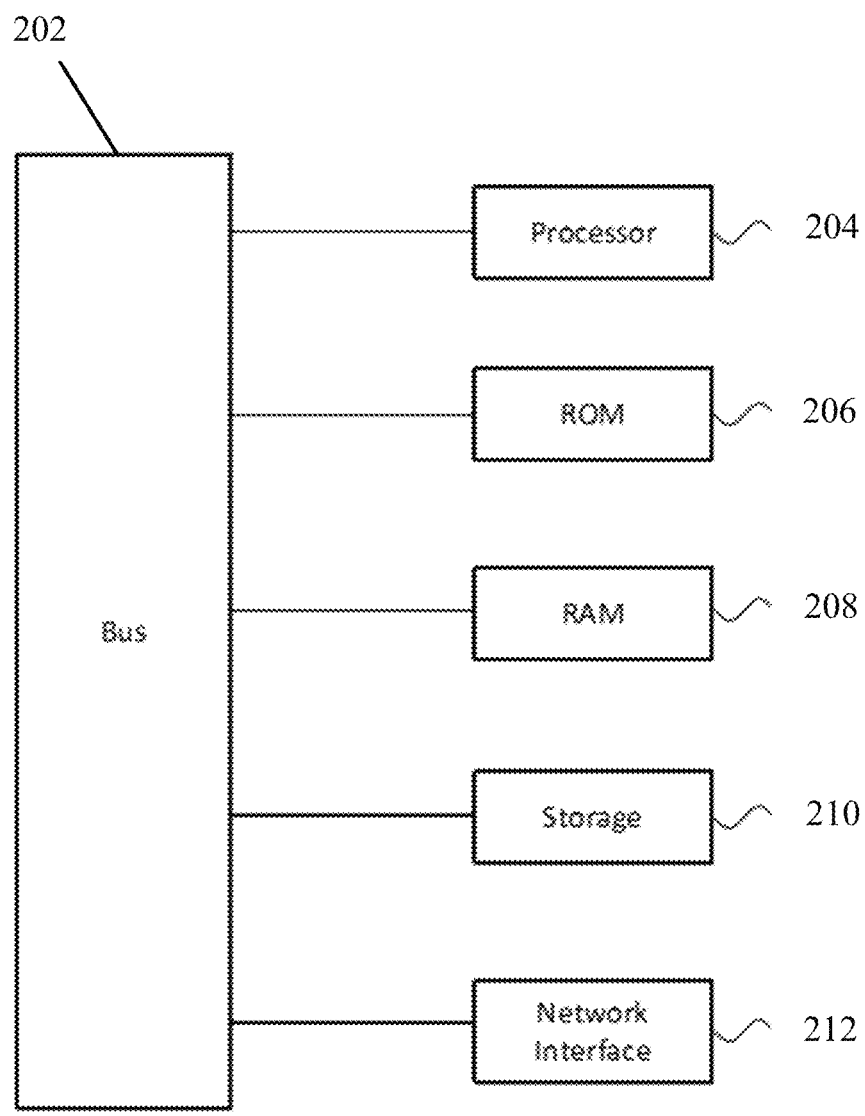
FIG. 2 is a simplified block diagram of one or more devices or systems within the exemplary environment of FIG. 1.

FIG. 2 is a block diagram of an exemplary system and/or device 200 within the environment 100. The device/system 200 includes a processor 204, such as a central processing unit (CPU), controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200. For example, as will be described below, the first and second fall detection devices 108, 110 may include some of the components within the device/system 200 and may also include further components such as one or more sensors. Additionally, and/or alternatively, the device/system 200 may further include components that might not be included within every entity of environment 100.

Figure 3:
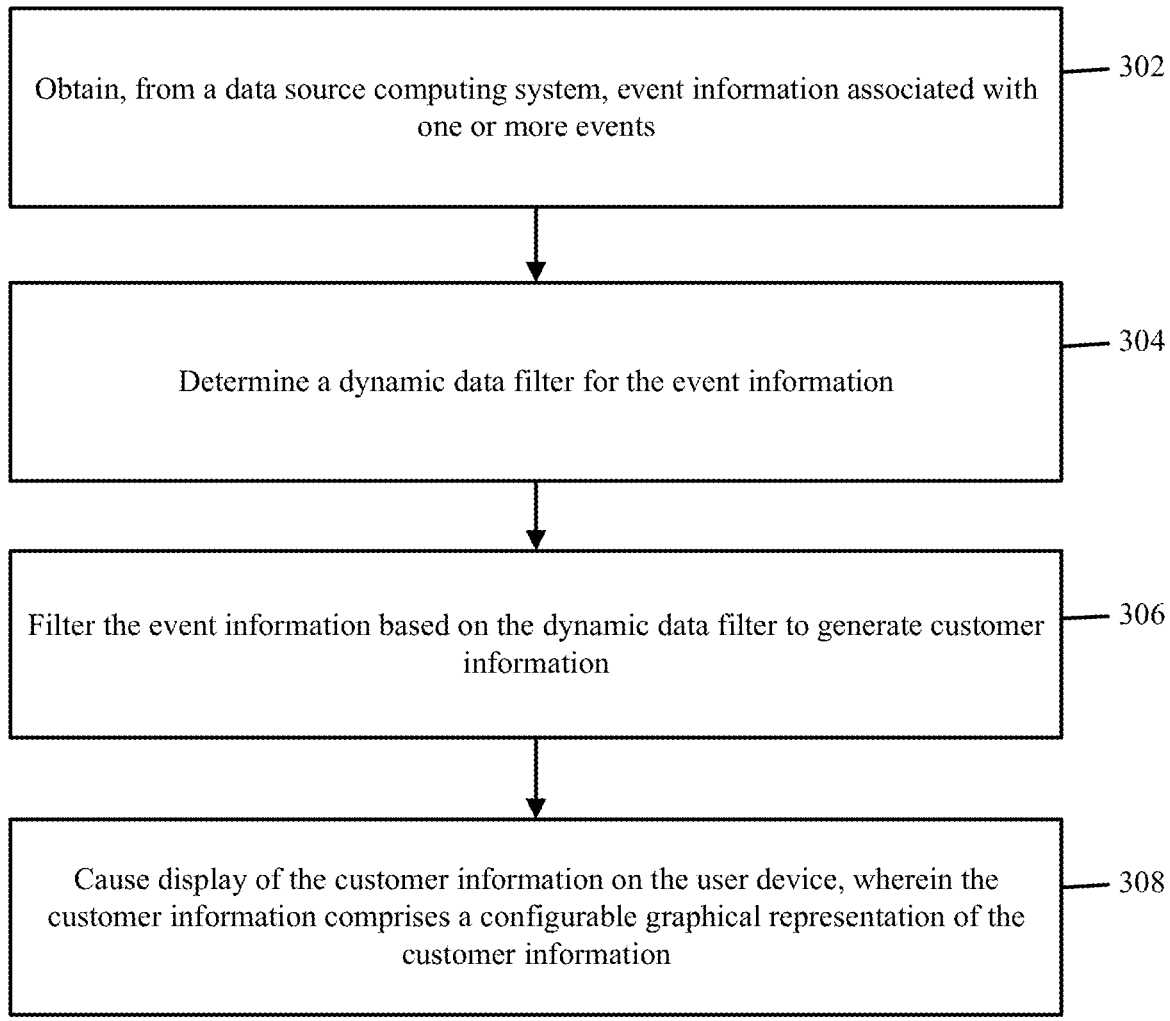
FIG. 3 is an exemplary process for using data applications and data filtering to improve customer communications in accordance with one or more examples of the present application.

FIG. 3 is an exemplary process for using data applications and data filtering to improve customer communications in accordance with one or more examples of the present application. The process 300 may be performed by the data filter analytics computing system 110 of environment 100 shown in FIG. 1. However, it will be recognized another entity (e.g., the user devices 104) may be used to perform process 300, that any of the following blocks may be performed in any suitable order, and that the process 300 may be performed in any suitable environment. The descriptions, illustrations, and processes of FIG. 3 are merely exemplary and the process 300 may use other descriptions, illustrations, and processes.

At block 302, a data filter analytics computing system 110 obtains, from a data source computing system 108, event information associated with one or more events. For instance, the data source computing system 108 may receive, collect, and/or otherwise obtain event information associated with one or more events. For instance, the event information may indicate an outage such as a service outage and/or a power outage. The data source computing system 108 may store the event information in memory. For instance, the data source computing system 108 may include and/or be associated with a database, warehouse, data marts, pipelines, servers and/or other types of storage locations configured to store the obtained event information. The data filter analytics computing system 110 may obtain (e.g., receive and/or retrieve) the event information from the data source computing system 108. The event information may indicate real-time event information associated with the event such as the power outage. The real-time event information may include, but is not limited to, line voltage, crew status, probable cause, estimated restoration time, restoration time, crew name, transformer, feeder, node, premise, customer account, or customer contact information. The above information may be updated in both real-time by the data source computing system 108 (e.g., an AMI or predicted and/or updated by crews, predictive systems (such as OMS/ADMS), or manually by personnel in the organization's command center).

Figure 4A:
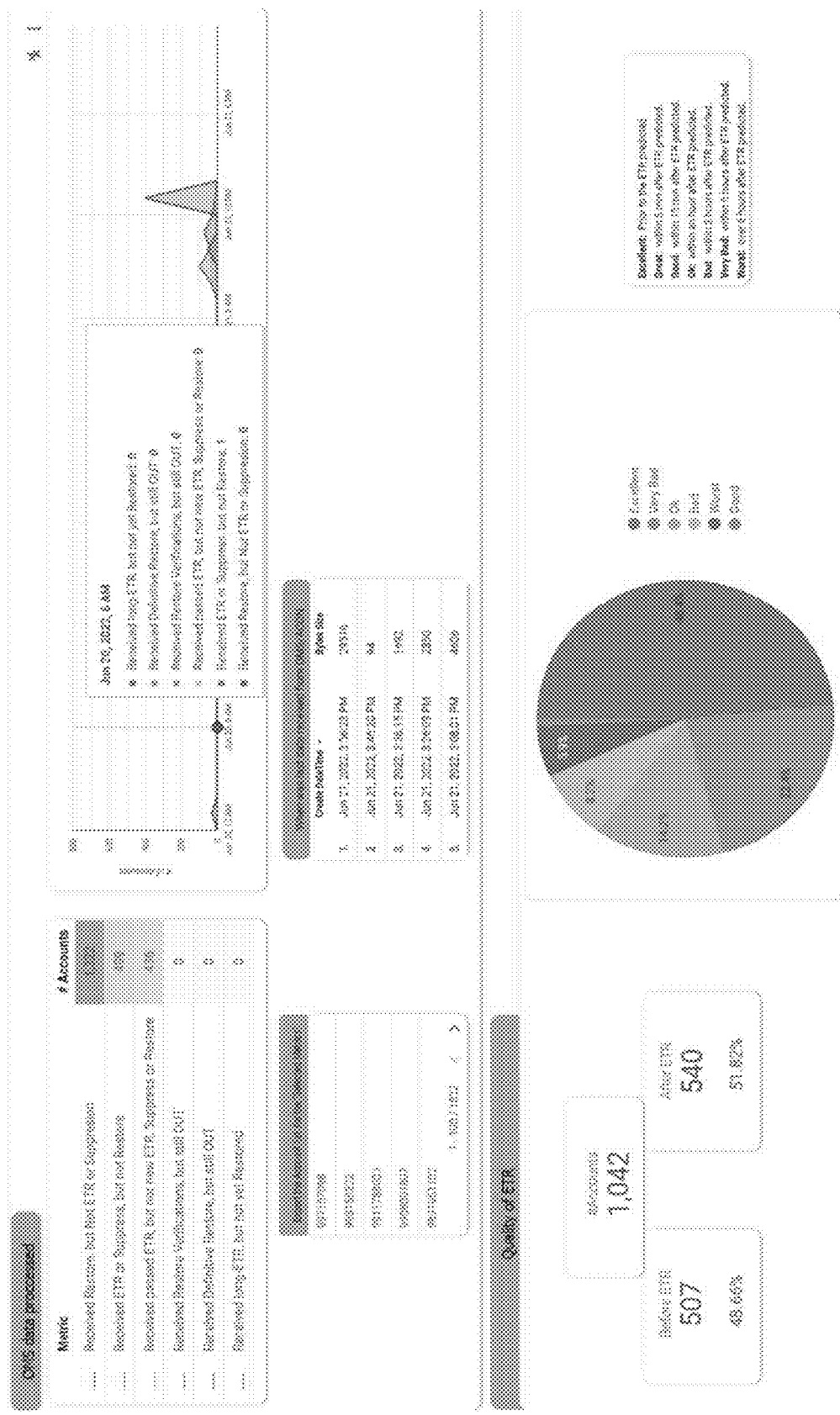
FIGS. 4A and 4B show exemplary dashboards in accordance with one or more examples of the present application.
Figure 4B:
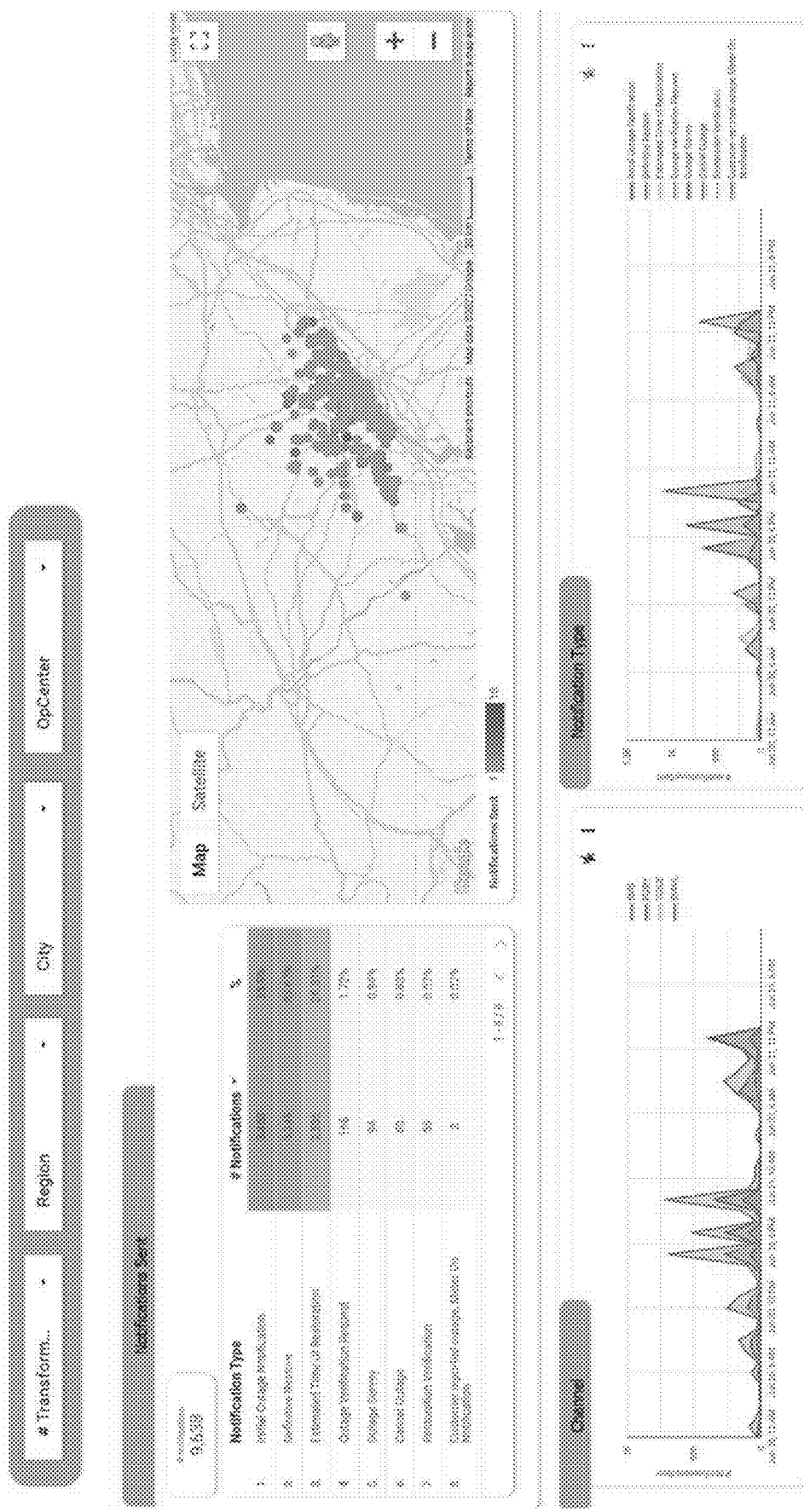

In some instances, the data filter analytics computing system 110 may display a customer outage dashboard, which is a configurable web view of outage communications over time. FIGS. 4A and 4B show exemplary dashboards 400 and 410 according to one or more examples of the present application. Dashboards 400 and 410 show information associated with the event such as customer communications sent by timeframe and geography per channel and message type. Further, the dashboard will describe user subject to specific filter conditions such as those impacted by severe storms whose estimated restoration is 24-48 hours or may not yet have received a restoration message. The dashboard will also provide the ability to export and/or notify these customers according to filter criteria and "drip" sequences to alleviate stress. Lastly, it will provide an estimated restoration time accuracy analysis that compares the ERT provided in communications to the actual restoration time, thereby, providing utilities the tools and information to learn and improve its processes. Additionally, and/or alternatively, the data filter analytics computing system 110 may provide the customer outage dashboard to the user device 104 and the user device 104 may display the customer outage dashboard. The dashboard may include a timeframe that is adjustable as are the regions and other metrics. In addition, the dashboard may display complex queries such as a number of customers who have received a specific message template such as estimated restoration time and no restoration message—meaning, one message in the order from the source data is missing. While users impacted may be listed or a graph may display this metric, the dashboard may include additional functionality such as sending a message to a customer. This functionality is in the form of a filter that is included in another platform such as a communications tool. The dashboard may also provide an analysis of communicated estimated restoration times and the actual restoration time in order to provide feedback to the data source and filtering system.

At block 304, the data filter analytics computing system 110 determines a dynamic data filter for the event information. The dynamic filter may indicate criteria or parameters for filtering the event information. In some instances, the user device 104 may provide the dynamic data filter for the event information such as "communicate to me only when my usage exceeds XYZ kilowatt hours," or similar metric threshold. Additionally, and/or alternatively, an operator may provide operator input to the data filter analytics computing system 110. The operator input may include the dynamic filter or it may be coded into one or more configuration files.

At block 306, the data filter analytics computing system 110 filters the event information based on the dynamic data filter to generate customer information. The customer information may indicate a message to the customer or user (e.g., a message that is provided to the user device 104) that is generated based on the dynamic data filter.

Dynamic filters are ones that are based on using massive data in data warehouses, repositories, servers, and/or other storage locations (e.g., the data source computing system 108), and may be determined (e.g., calculated) based on complex conditional logic (e.g., "AND" conditional statements or "OR" conditional statements). In some examples, in order to apply a filter to the user population who may be experiencing an extended outage (e.g., a power outage), the following criteria or dynamic filter is applied: "account=active AND cust.pref=exists AND last.ert<=10-10-2021 9:30 am AND outage=active".

Based on the above dynamic filter (e.g., query), the data filter analytics computing system 110 may apply a filter may for active customers currently experiencing an outage (e.g., "account=active AND cust.pref=exists . . . AND outage=active") with a communications preference whose last estimated restoration time (ERT) was 12 hours ago and is now 9:30 pm (e.g., "last.ert<=10-10-2021 9:30 am"). In some instances, the data filter analytics computing system 110 may include additional complex data application logic, which may be logic to determine the last message sent to the user and apply logic to the basis for the message creation. In other words, the data filter analytics computing system 110 may determine the last message sent by the data filter analytics computing system 110 to the user device 104. The data filter analytics computing system 110 may use the last message sent to determine the next message to be sent to the user device 104. As an example, even in spite of changes in the data source, it is not always desirable to send an update to the user. Aside from the annoyance, incremental and/or nominal changes do not necessarily represent actionable data to the user. As such, the data filter analytics computing system 110 may reference or use the previous message to the user, along with a maximum number of messages per period to the user prior to sending the next message. If the previous message communicated a restoration time that differs by less than 15 minutes from the previous one, the data filter analytics computing system 110 might not send a message to the user. The same may be applicable to a leak for which the rate has not changed since the previous message was sent to the user. Further, the data filter analytics computing system 110 may use the previous message to determine whether a new type of message should be sent. If the user received a message indicating service restoration in 48 hours, the system may send periodic updates every six hours in order to avoid communications silence.

In some instances, to generate the dynamic filter, the data filter analytics computing system 110 may use user input from the user device 104. The user input may include the user 102 providing a typed out logical statement using fields and values (e.g., similar to a structured query language (SQL) query).

In some examples, to generate the dynamic filter, the data filter analytics computing system 110 may use user input from the user device 104. The user input may be associated with the user 102 speaking the desired outcome to the user device 104 executing an application. For instance, the user 102 may speak their desired outcome, and the user device 104 may use natural language processing (NLP) and/or other algorithms or processes to generate a dynamic data filter. The user device 104 may provide the generated dynamic data filter to the data filter analytics computing system 110.

In some variations, to generate the dynamic filter, the data filter analytics computing system 110 and/or the user device 104 may define possible conditions and have the dynamic data filters prebuilt to reflect those conditions. This is described in Table 1 below. For instance, the data filter analytics computing system 110 may retrieve a data array (e.g., the information included within Table 1) indicating a plurality of conditions (e.g., conditions of the user) and a plurality of actions to perform based on the conditions. Additionally, and/or alternatively, the data array may include notifications previously provided to the user ("Notification") and the actual status of the power outage ("Actual"). The data filter analytics computing system 110 may determine the dynamic data filter based on the retrieved data array, the conditions associated with the user 102 (e.g., received from the user device 104), and/or the event information. For instance, the condition of user 102 may indicate ("standard ERT"). The data filter analytics computing system 110 may determine the dynamic data filter as the action associated with the condition (e.g., a normal dynamic data filter indicating normal information such as estimated time until power is back up). If the condition of user 102 indicates ("Nested outage"). The data filter analytics computing system 110 may determine the dynamic data filter as the action(s) associated with the condition (e.g., Updated outage information such as an updated time until power is restored and empathy such as an apology message). Additionally, and/or alternatively, the data filter analytics computing system 110 may determine the dynamic data filter based on the condition and the notification previously sent to the user.

Figure 4C:
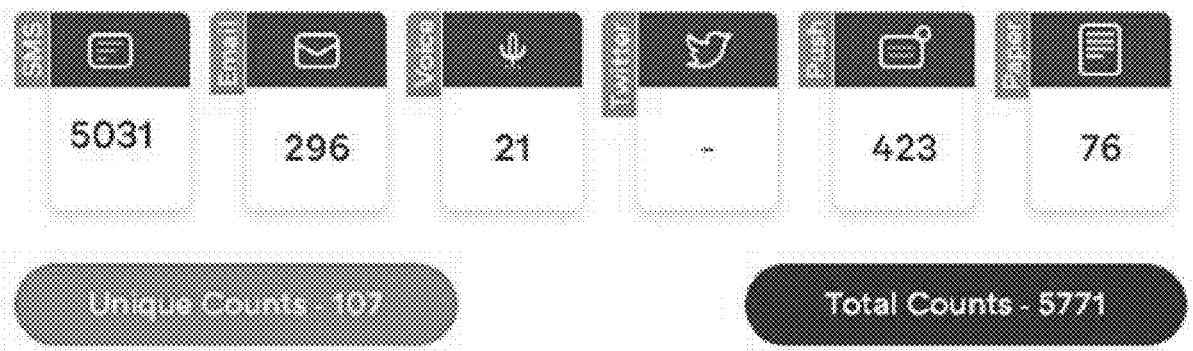
FIG. 4C is a display screen for generating dynamic data filters in accordance with one or more examples of the present application.

FIG. 4C is a display screen 450 for generating dynamic data filters in accordance with one or more examples of the present application. For instance, the display screen 450 may be displayed on the user device 104. The user 102 may select filter fields (e.g., "Account Type" or "Account Zip Code") and input information associated with the filter fields (e.g., a zip code where the user 102 lives). Based on the user input associated with the filter fields and the input information, the user device 104 may generate a dynamic data filter and provide the dynamic data filter to the data filter analytics computing system 110. Filter fields such as "Outage Status" and "Status Duration" are dynamically calculated in real-time from multiple rows in the data source and leveraged as criteria for complex messaging such as severe weather "drip" campaigns where a sequence of messages is sent based upon disruption duration. Additionally, and/or alternatively, the data filter analytics computing system 110 may display the display screen 450 and an operator may input operator information associated with the filter fields and the input information. Additionally, Table 1 below shows a process for generating a dynamic data filter.

| Notification | Actual | Condition | Action |
|---|---|---|---|
| ERT sent | Outage | Standard ERT | Normal |
| Restore sent | Outage | Nested outage | Updated outage & empathy |
| No restore sent | Restored | Nested outage | Empathy after storm |
| ERT sent | Severe outage | Long ERT | Empathy and trend |
| ERT sent & passed | Outage | Long ERT | Empathy and restoration trends |
| Message missed | | Data/process issue | Empathy message |

For instance, as described in the fourth row in Table 1, based on the data filter analytics computing system 110 (or ticketing system or related equipment) triggering a message that service was out with an estimated restoration time but not formally issue a restoration, the user 102 may not know that service was restored (unless they were home). This would provide an incomplete customer experience. As such, the data filter analytics computing system 110 may use the dashboard to create a series of manual messages and/or programmatic messages that addresses this scenario. In this case, the data filter analytics computing system 110 may provide an apology message that may be sent after 90% of users are have their power restored and/or over a 3-day period. Likewise, after research by a utility company associated with the data filter analytics computing system 110, the utility company may determine (e.g., identify) a block of users that were misinformed and they use the data filter analytics computing system 110 with a series of dynamically generated filters to identity and message these customers. For instance, the data filter analytics computing system 110 may generate dynamic filters to determine a block of users that were misinformed, and provide an apology message to the block of users.

Figure 6:
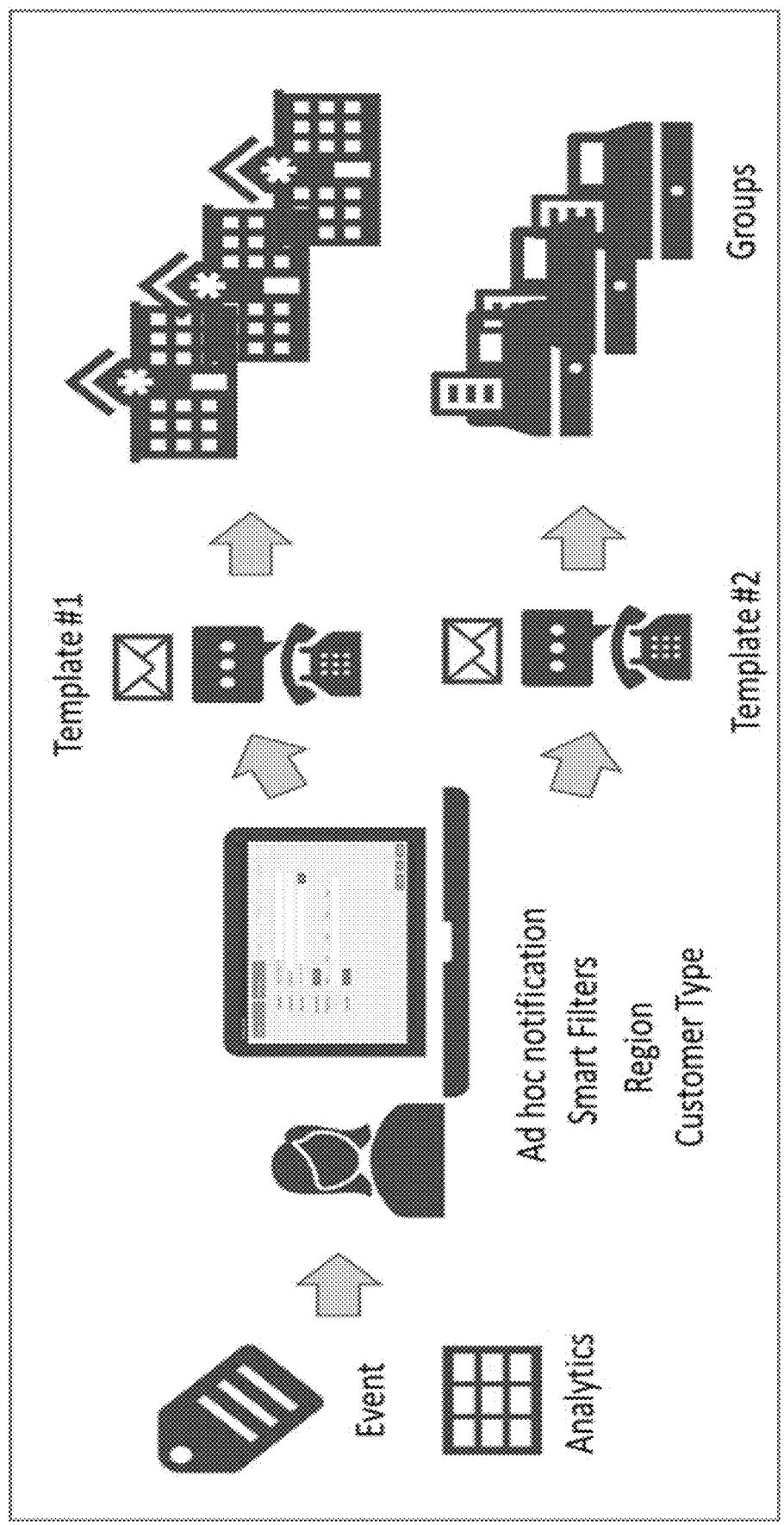
FIG. 6 shows another exemplary process for using data applications and data filtering to improve customer communications in accordance with one or more examples of the present application.

Another example is row 6 of Table 1 where a customer with a long restoration window and no ETR was sent in a period of time. Herein, the utility company may manually send messages in accordance with rules and filters that are compiled using other situational information as shown in FIG. 6 described below. Likewise, the data filter analytics computing system 110 accepts feeds from weather maps and notifies customers after a certain amount of time (e.g., 12 hours), which may be configurable, of inactivity (no messages sent) and inform them of the anticipated restoration effort or what restoration looks like over time in their community. The data filter analytics computing system 110 may use cloud data platforms (e.g., the data source computing system 108) to roll-up number of users with restored services after an outage at various intervals. As such, the data filter analytics computing system 110 may determine the users on demand using dynamic data filters.

At block 308, the data filter analytics computing system 110 causes display of the customer information on the user device 104. The customer information comprises a configurable graphical representation (e.g., an embedded, configurable graphic) of the customer information. This graphical representation may be specific to the recipient (their premise or area) and describes the service restoration activity. The restoration activity may be number of premises without service or restored by hour to transparently provide users with data that informs the pace of restoration. At present, many utilities provide static maps that represent outage status in the jurisdiction; this view essentially creates time as a dimension. For instance, the displayed customer information may include a message (e.g., a text message) and/or a graphical representation (e.g., a graph indicating a percentage of people without power within a certain time period such as the last 24 hours). In this case, the user may infer the pace of restoration and extrapolate when their premise will be restored. Uniquely, this data is premise specific and created in real-time for each user instead of a static map or executive overview.

In some instances, process 300 may repeat one or more times. For instance, there may be updates to the one or more events (e.g., an update to a severe weather event). The updates to the events may be any update associated with the event such as an update to a severe weather event (e.g., the severe weather event has ended), an update on the estimated restoration time (e.g., a new estimated restoration time for when the user will receive power, internet, water, and so on back), and/or other types of updates. As such, the data filter analytics computing system 110 may obtain updated event information indicating an update to the event. The data filter analytics computing system 110 may determine a new dynamic data filter for the updated event information, which may be different from the original dynamic data filter. For instance, the new dynamic data filter may be used to filter the event information to ascertain the status updates to the event (e.g., whether there has been an update to the estimated restoration time), status update of the user (e.g., whether the user has their power or service restored), or a previous notification provided to the user device. The data filter analytics computing system 110 may generate new customer information (e.g., a new message). The new customer information indicates one or more real-time updates (e.g., the severe weather event has ended or the new estimated restoration time will be in two hours) to the one or more events.

In some variations, the configurable graphical representations provided to the user devices 104 may be different for different users. For instance, users may live in different area codes and therefore, the configurable graphical representations may represent different geographical maps. Additionally, and/or alternatively, a first user may seek to see the information about the event using a bar graph whereas a second user may seek to see the information using a pie graph or another type of graphical representation. Therefore, based on the dynamic filters (e.g., a first dynamic filter associated with a first user device for a first user and a second dynamic filter associated with a second user device for a second user), the data filter analytics computing system 110 may generate different customer information (e.g., first and second customer information) and display the different customer information on the user devices. For instance, the data filter analytics computing system 110 may display a first configurable graphical representation on a first user device (e.g., a geographical map of a first area code associated with a first user) and display a second configurable graphical representation, which is user-specific, on a second user device (e.g., a geographical map of a second area code associated with a second user).

Figure 5A:
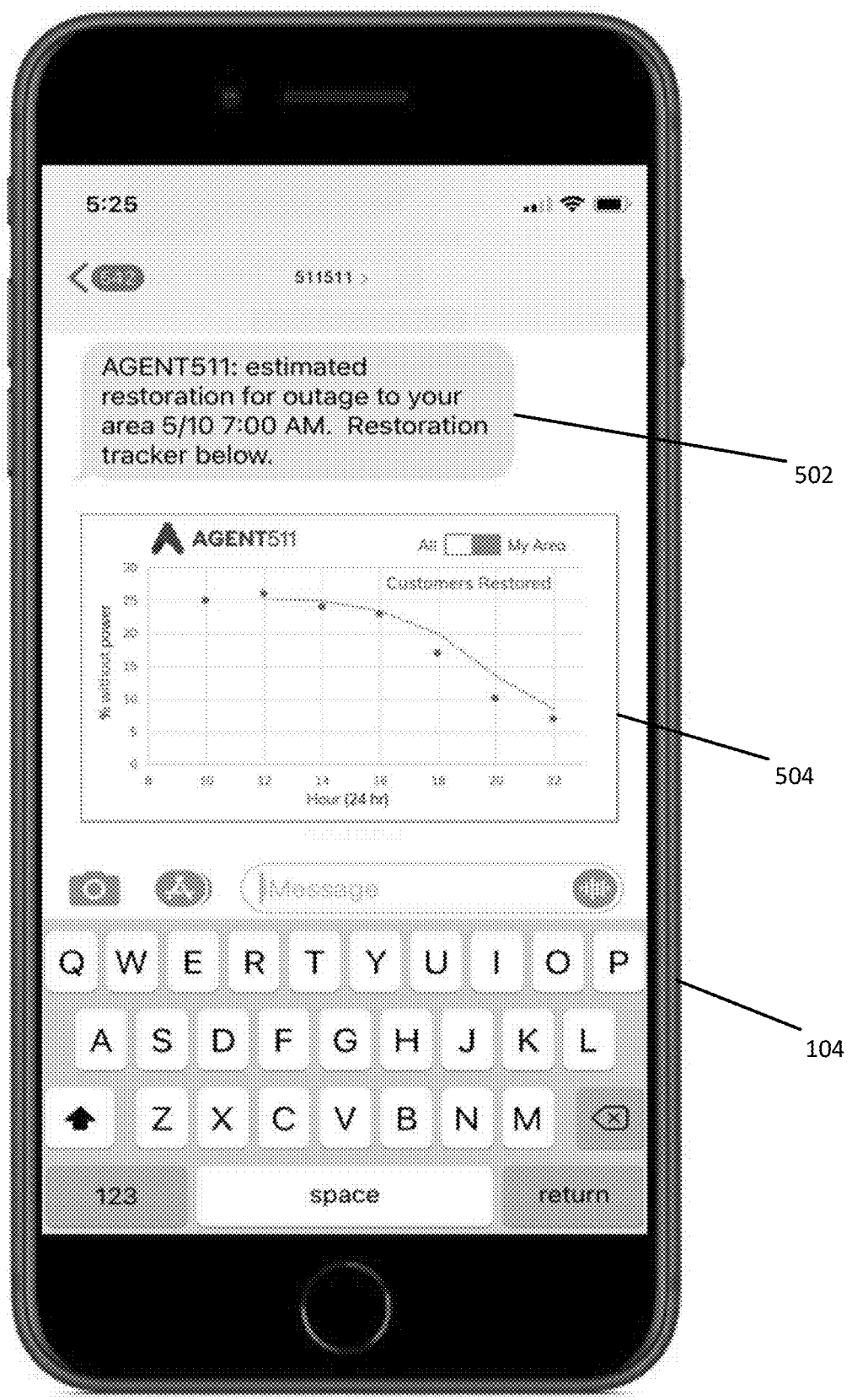
FIG. 5A shows a display screen of the user device in accordance with one or more examples of the present application.
Figure 5B:
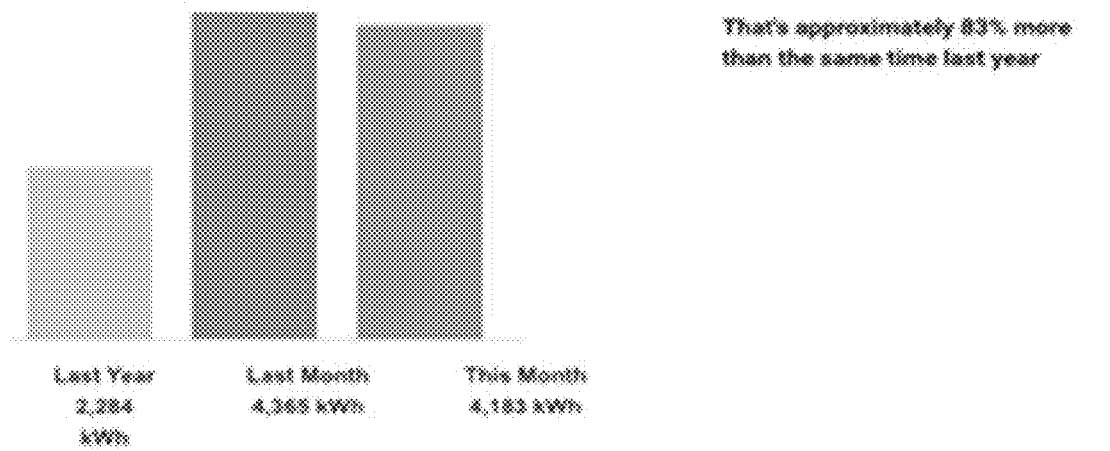
FIG. 5B shows another display screen of the user device in accordance with one or more examples of the present application.
Figure 5B:
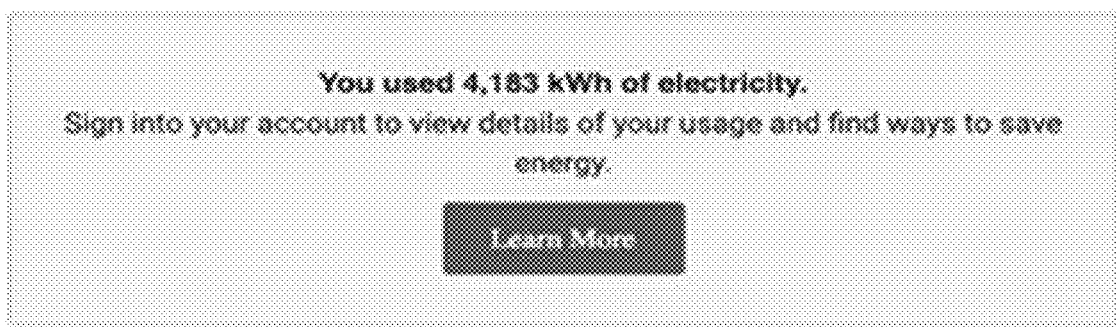

FIG. 5A shows a display screen of the user device 104 in accordance with one or more examples of the present application. For instance, FIG. 5A shows a user device 104 with a message 502 and a graphical representation 504. For example, FIG. 5A shows a customer message with an embedded, configurable graphic 504 for the user 102 that shows restorations overtime so that users recognize the rate and magnitude of the restoration effort. In some instances, the customer message may be an embedded link or video image that provides additional views such as by neighborhood. In some instances, a customer's energy usage over time may be displayed on the user device 104. Herein, the customer message may be dynamically generated using actual data with dynamic filters and queries. FIG. 5B shows another display screen 450 of the user device in accordance with one or more examples of the present application. For instance, the display screen 450 includes a graphical representation (bar graph) of the user's usage of electricity.

FIG. 6 shows another exemplary process for using data applications and data filtering to improve customer communications in accordance with one or more examples of the present application. For instance, initially event information and analytics may be obtained (e.g., by the data filter analytics computing system 110). Then, the data filter analytics computing system 110 may obtain smart filters (e.g., dynamic data filter) and perform notification smart filters based on region and/or customer type. Afterwards, the data filter analytics computing system 110 may provide customer information using templates (e.g., a first template or a second template). The data filter analytics computing system 110 may provide the customer information to different groups. For instance, a first group may receive the first template and a second group may receive the second template.

Figure 7:
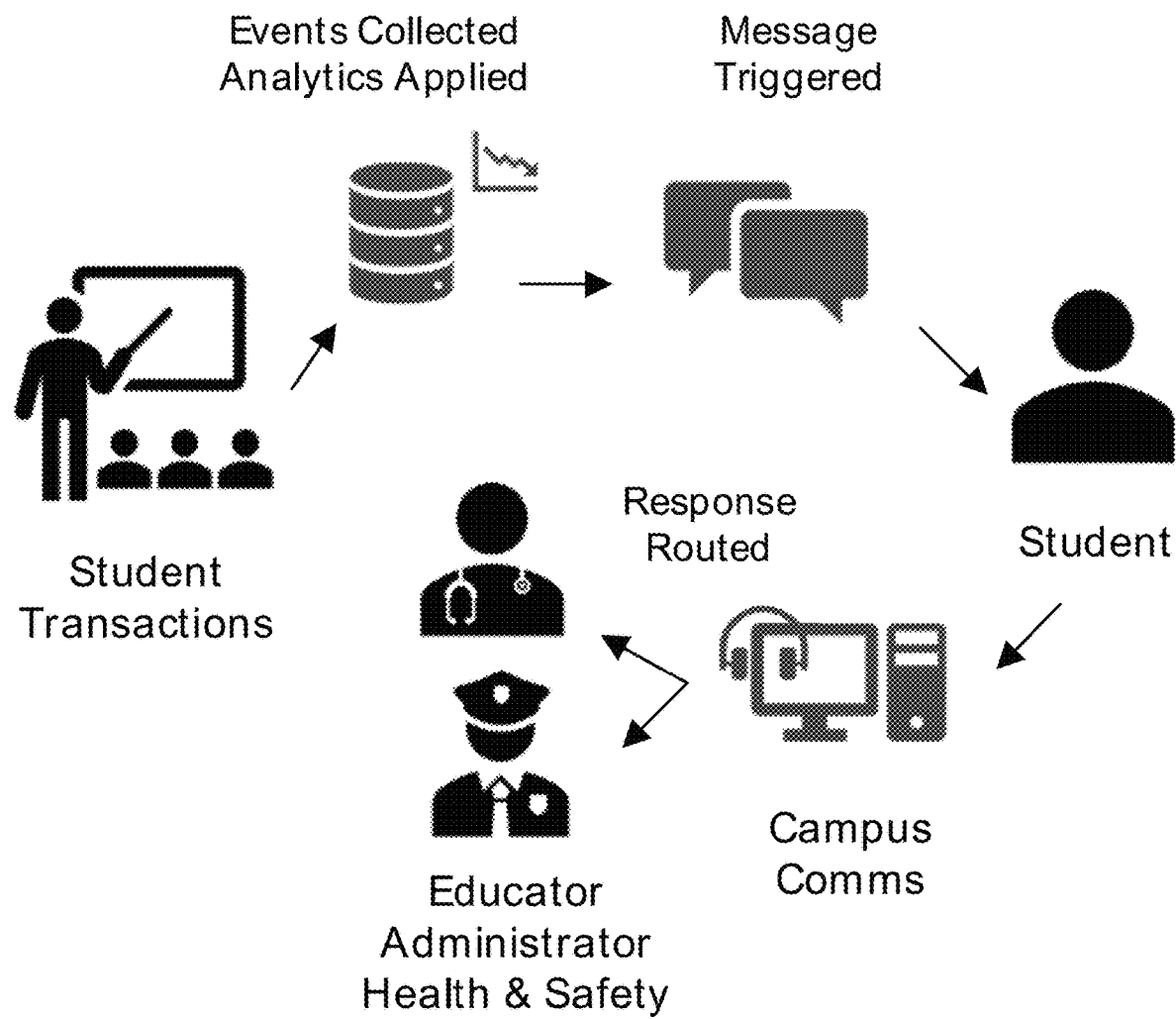
FIG. 7 shows another exemplary process for using data applications and data filtering to improve customer communications in accordance with one or more examples of the present application.

FIG. 7 shows another exemplary process for using data applications and data filtering to improve customer communications in accordance with one or more examples of the present application. For instance, as shown in FIG. 7, "nudging" taps information systems, in this case for students, to expose short-term and cumulative changes in data such as grades, attendance, and even participation in activities and applies rules to determine when send a proactive template-based message and/or notify administrators and campus safety via email of more concerning trends. Herein, data tools leverage conditional statements to instantly adapt to the data and initiate communication messages to the students. Replies to the message are routed to either a professor, administrator, or campus safety based upon nudge applied and the content of the message. The intent of the message is discerned by applying natural language processing (NLP), or machine learning, to the content of the message. These intents may be determined initially and improved by continuously evaluating messages and the actual routing as compared to the expected routing. Herein, the data is continuously evaluated on a dashboard and intents are added and updated both manually. An example table of intents is shown in Table 2 and may be continuously updated based upon learnings.

TABLE 2

| Reply Message | Nudge | Routing |
| --- | --- | --- |
| I need to meet because I don't understand this section | Minor | Processor/Academic Department |
| I need help | Minor | Academic Department/Administrator |
| A friend recently passed away | Major | Administrator |
| I am really sad | Major | Administrator/Campus Safety |
| I am going to hurt myself | Major | Campus Safety |

In other words, student transactions may be obtained and collected (e.g., by the data source computing system 108), then analytics may be applied (e.g., by the data filter analytics computing system 110). The data filter analytics computing system may trigger messages for the student (e.g., user). This may be provided to the campus communications (comms) and the response may be routed from there (e.g., to educators, administrators, or health & safety people at the school).

Figure 8:
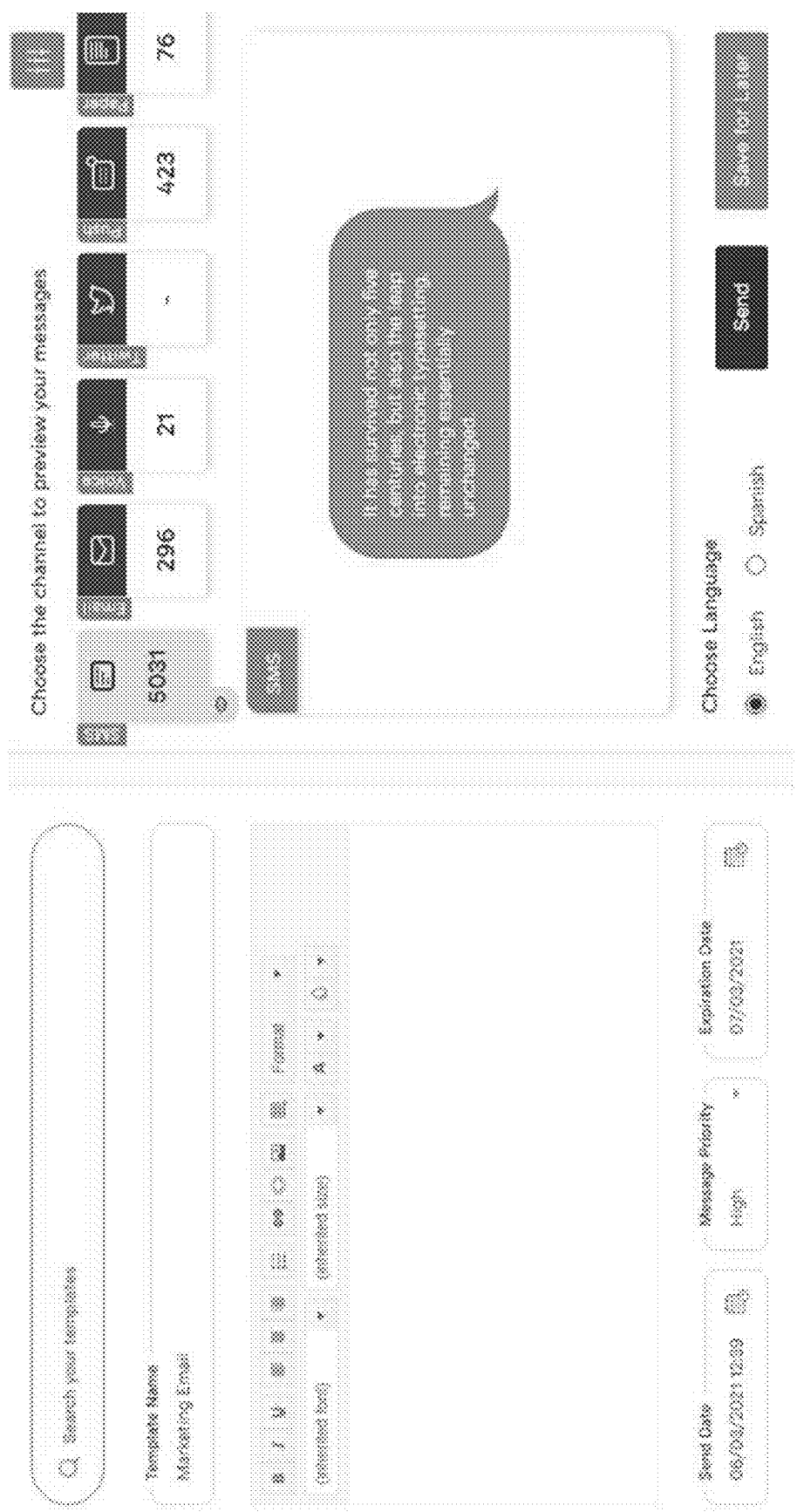
FIGS. 8 and 9 show display screens by which a utility system creates informative empathic communication templates that are associated with the dynamic filter conditions.
Figure 9:
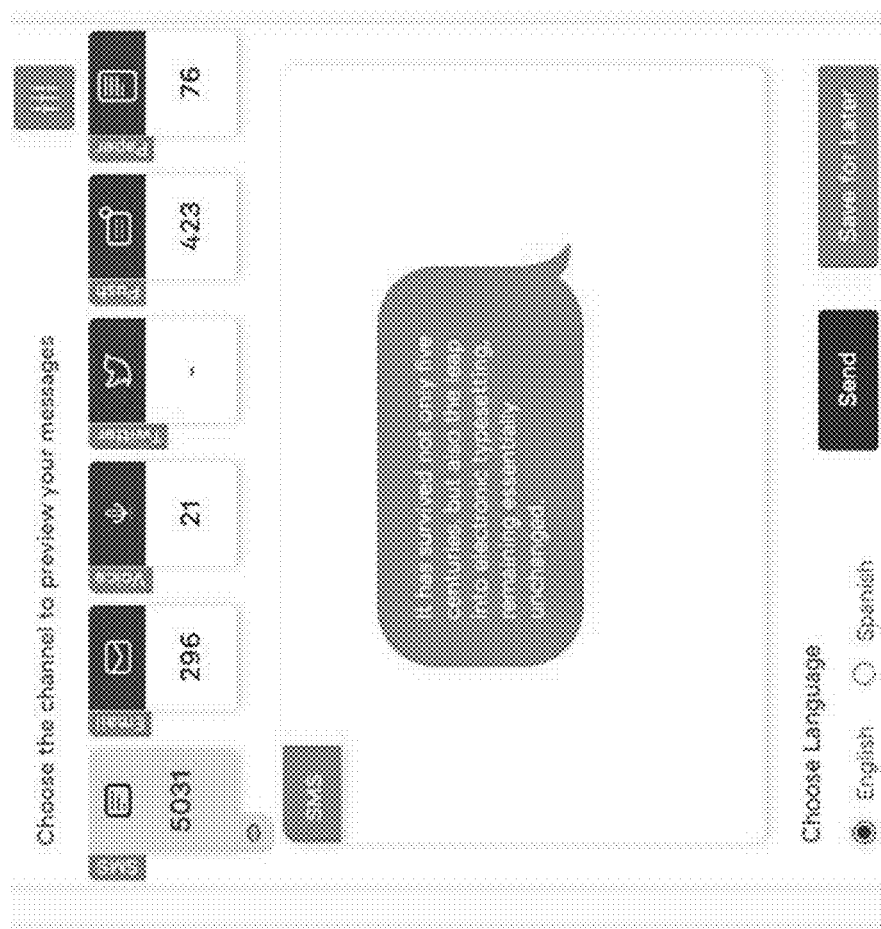
Figure 9:
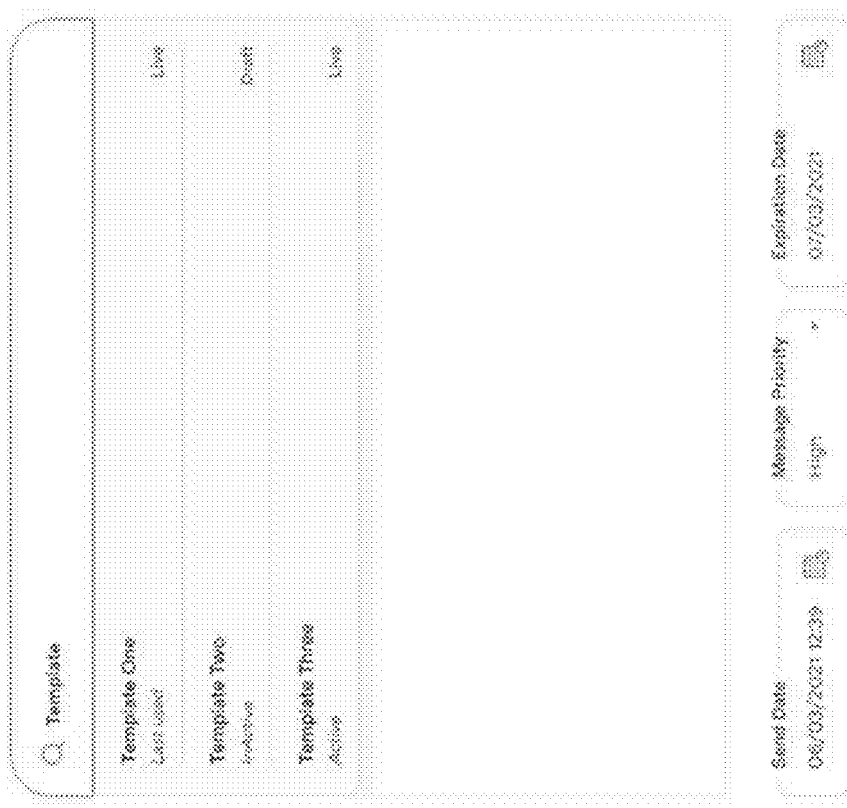

FIGS. 8 and 9 show display screens 800 and 900 (e.g., interfaces) by which a utility system (e.g., the data filter analytics computing system 110) creates informative empathic communication templates that are associated with the dynamic filter conditions. Templates are specific to each communications channel, whether voice, text, email, social media, or website, non-inclusively and flexible fields that describe user descriptive content such as name, address, premise, or an amount provided by the data source. Templates are stored in the database and invoked when a complex condition created by the dynamic filters are created. They can be sent as a result of an external data source or manual administrator who logs into a system user interface.

In some instances, by using the present application, first, a dashboard (e.g., a storm dashboard) may be displayed. It is the source of all the outage data (e.g., the data indicating an outage such as a power outage). Herein, the outage data may be filtered by storm, ETR, and region, and may be shown on a map (e.g., displayed on the user device 104). If the impact was clustered, a specific region on the map displayed on the user device 104 may be focused.

In some instances, based on the severity (e.g., the severity of the storm), the customers or users are in for restoration times (e.g., times before power is restored) that exceed 24 hours or more. Information is sometimes scarce and customers are uneasy. The data filter analytics computing system 110 may export the impacted customers to the map and author a sequence of curated personalized content for these customers. Additional rules such as quiet hours and overrides may be applied by the data filter analytics computing system 110. In some variations, a new event (e.g., event associated with the storm) may be created by the data filter analytics computing system 110. First, the data filter analytics computing system 110 may receive user input to name the event and provide a description and timeline. Then, the data filter analytics computing system 110 may create custom templates for any channels such as email. Thereafter, the data filter analytics computing system 110 may customize a series of messages and the periodicity after the initial ETR. In this case, the data filter analytics computing system 110 may set rules (e.g., filter criteria) for the event such as ETR duration, region, and even quiet hours.

The data filter analytics computing system 110 may initially start with a standard outage alerts message that is provided to the user device 104 that an outage is reported and the ETR is in the future. The data filter analytics computing system 110 is used and keeps customers updated with a regular stream of messages. Each one (e.g., four) provide kind, clear messages with links to a utility company content such as maps, restoration resources, and storm information. In some instances, messages may be sent every 3-5 seconds. For instance, the data filter analytics computing system 110 may cause display the messages on the user device in a sequential order and one after another (e.g., after a set amount of time from the previous message). Upon completion, the customer receives the standard outage restoration message. Later on they may receive an outage survey.

FIGS. 10 and 11 show display screens for providing administrative interfaces for rules and templates in accordance with one or more examples of the present application. For instance, referring to FIG. 10, display screen 1000 may be displayed on the user device 104 and/or the data filter analytics computing system 110. A user 102 and/or an operator may input information (e.g., user input) associated with the event such as event name, event description, start/end date, templates and so on. Further, messages may be included and the data filter analytics computing system 110 may provide these messages to the user device 104. Referring to FIG. 11, display screen 1100 may be displayed on the user device 104 and/or the data filter analytics computing system 110. Display screen 1100 may be the lower portion of display screen 1000. For instance, three messages are shown that may be provided by the data filter analytics computing system 110 to the user device 104. These messages may be sent after a certain amount of time after the event has been created.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A method, comprising:
obtaining, from a data source computing system and by a data filter analytics computing system, event information associated with one or more events;
determining, by the data filter analytics computing system, a dynamic data filter for the event information, wherein determining the dynamic data filter comprises:
retrieving a data array associated with a plurality of conditions and a plurality of actions;
receiving, from a user device, one or more conditions associated with a user; and
generating the dynamic data filter based on comparing the one or more conditions associated with the user and the plurality of conditions within the data array, and further based on a previous notification provided to the user device and an actual status of a power outage;
generating, by the data filter analytics computing system, customer information based on filtering the event information using the dynamic data filter; and
causing, by the data filter analytics computing system, display of the customer information on the user device, wherein the customer information comprises a configurable graphical representation of the customer information.

2. The method of claim 1, wherein the one or more events comprises the power outage, and wherein the event information indicates an estimated restoration time for the power outage, a line voltage, and a plurality of customer accounts associated with the power outage.

3. The method of claim 1, wherein determining the dynamic data filter comprises:
receiving, from the user device, the dynamic data filter, wherein the dynamic data filter indicates an account type associated with the user, an account zip code associated with the user, the outage status for the user, and a status duration for the user.

4. The method of claim 3, wherein the user device generates the dynamic filter based on a natural language processing (NLP) algorithm.

5. The method of claim 1, further comprising:
receiving user input comprising a plurality of informative empathic communication templates, and
wherein generating the customer information is based on the plurality of informative empathic communication templates.

6. The method of claim 5, wherein the user input indicates an event name and an event description for the one or more events.

7. The method of claim 1, wherein the customer information comprises a plurality of messages, and wherein causing display of the customer information on the user device comprises:
causing display of a first message, from the plurality of messages, at a first instance in time; and
causing display of a second message, from the plurality of messages, at a second instance in time.

8. The method of claim 1, further comprising:
obtaining, from the data source computing system, updated event information associated with the one or more events, wherein the updated event information is associated with one or more real-time updates to the one or more events;
determining a new dynamic data filter for the updated event information, wherein the new dynamic data filter is different from the dynamic data filter; and
generating new customer information based on filtering the updated event information using the new dynamic data filter, wherein the new customer information indicates one or more real-time updates to the one or more events.

9. The method of claim 8, wherein the new dynamic filter indicates an updated status of the user, an updated status of the one or more events, or a previous notification provided to the user device.

10. The method of claim 1, wherein the dynamic data filter is associated with the user device, and wherein the method further comprising:
receiving, by the data filter analytics computing system, a second dynamic data filter from a second user device;
generating second customer information based on filtering the event information using the second dynamic data filter; and
causing display of the second customer information on the second user device, wherein the customer information comprises a second configurable graphical representation of the second customer information, wherein the second configurable graphical representation is user-specific to the second user device and is different from the configurable graphical representation of the customer information of the user device.

11. The method of claim 1, wherein the one or more events comprises a gas leak, a water main break, an internet outage, or a severe weather event.

12. A data filter analytics computing system, comprising:
one or more processors; and
a non-transitory computer-readable medium having processor-executable instructions stored thereon, the processor-executable instructions, when executed, facilitating performance of the following:
obtaining, from a data source computing system, event information associated with one or more events;
determining a dynamic data filter for the event information, wherein determining the dynamic data filter comprises:
retrieving a data array associated with a plurality of conditions and a plurality of actions;
receiving, from a user device, one or more conditions associated with a user; and
generating the dynamic data filter based on comparing the one or more conditions associated with the user and the plurality of conditions within the data array, and further based on a previous notification provided to the user device and an actual status of a power outage;
generating customer information based on filtering the event information using the dynamic data filter; and
causing display of the customer information on the user device, wherein the customer information comprises a configurable graphical representation of the customer information.

13. The data filter analytics computing system of claim 12, wherein the one or more events comprises a power outage, and wherein the event information indicates an estimated restoration time for the power outage, a line voltage, and a plurality of customer accounts associated with the power outage.

14. The data filter analytics computing system of claim 12, wherein determining the dynamic data filter comprises:

receiving, from the user device, the dynamic data filter, wherein the dynamic data filter indicates an account type associated with the user, an account zip code associated with the user, an outage status for the user, and a status duration for the user.

15. A non-transitory computer-readable medium having processor-executable instructions stored thereon, the processor-executable instructions, when executed, facilitating performance of the following:

obtaining, from a data source computing system, event information associated with one or more events;

determining a dynamic data filter for the event information, wherein determining the dynamic data filter comprises:

retrieving a data array associated with a plurality of conditions and a plurality of actions;

receiving, from a user device, one or more conditions associated with a user; and generating the dynamic data filter based on comparing the one or more conditions associated with the user and the plurality of conditions within the data array, and further based on a previous notification provided to the user device and an actual status of a power outage;

generating customer information based on filtering the event information using the dynamic data filter; and causing display of the customer information on the user device, wherein the customer information comprises a configurable graphical representation of the customer information.

\* \* \* \* \*